United States Patent [19]

Miyagawa

[11] 4,272,592
[45] Jun. 9, 1981

[54] STORAGE BATTERY

[75] Inventor: Shiro Miyagawa, Suita, Japan

[73] Assignee: Miyagawa Kasei Industry Co., Ltd., Osaka, Japan

[21] Appl. No.: 46,651

[22] Filed: Jun. 8, 1979

[30] Foreign Application Priority Data

Jun. 27, 1978 [JP] Japan .............................. 53/89039[U]

[51] Int. Cl.³ .............................................. H01M 2/30
[52] U.S. Cl. .................................... 429/161; 429/179; 29/623.2
[58] Field of Search ............... 429/179, 161; 29/623.1, 29/623.2

[56] References Cited

U.S. PATENT DOCUMENTS

| | | | |
|---|---|---|---|
| 2,132,793 | 10/1938 | Kyle | 429/179 |
| 3,607,441 | 9/1971 | Mix | 29/623.1 |
| 4,150,202 | 4/1979 | Tiegel | 429/179 |

FOREIGN PATENT DOCUMENTS 463814  4/1974  Australia .................................. 429/179

Primary Examiner—Donald L. Walton
Attorney, Agent, or Firm—W. G. Fasse; D. F. Gould

[57] ABSTRACT

A storage battery is made of thermoplastic synthetic resin by a molding process whereby the electrode reading-out members are placed in advance in a die for molding the electrolyte container body of the storage battery, so that the storage battery has such electrode leading-out members disposed across the lateral wall of the electrolyte container body. A spacing is defined between the surface of each electrode leading-out member facing the inside of the electrolyte container body and the portion of the electrolyte container body around the above-mentioned surface, whereby the region between the inward surface of the electrode leading-out member and the portion of the electrolyte container body therearound are heat-insulated from each other.

2 Claims, 16 Drawing Figures

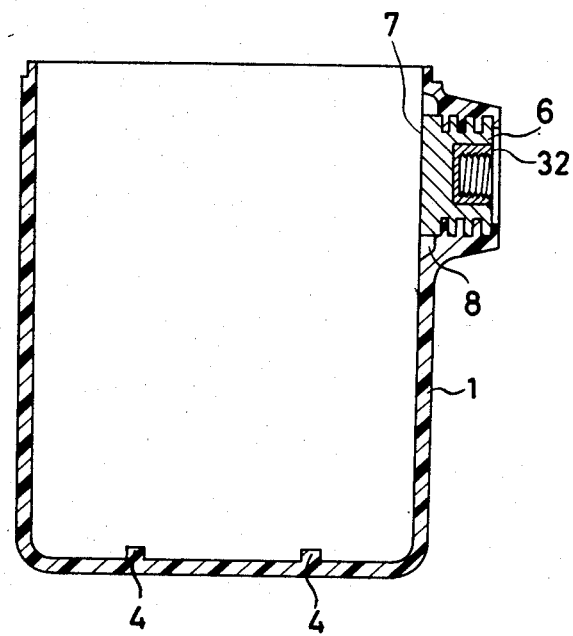
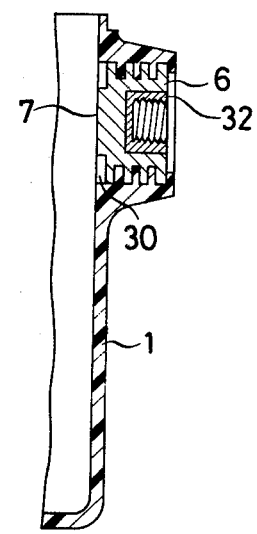
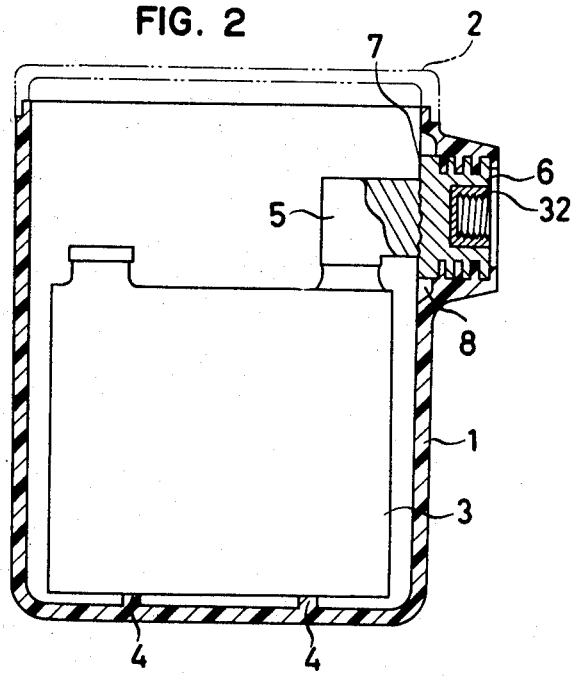
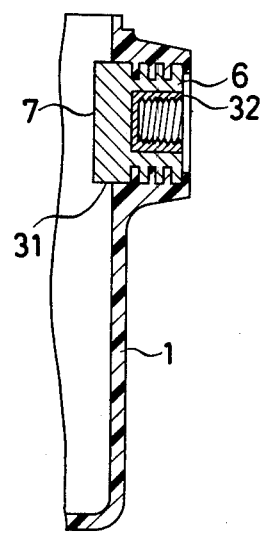

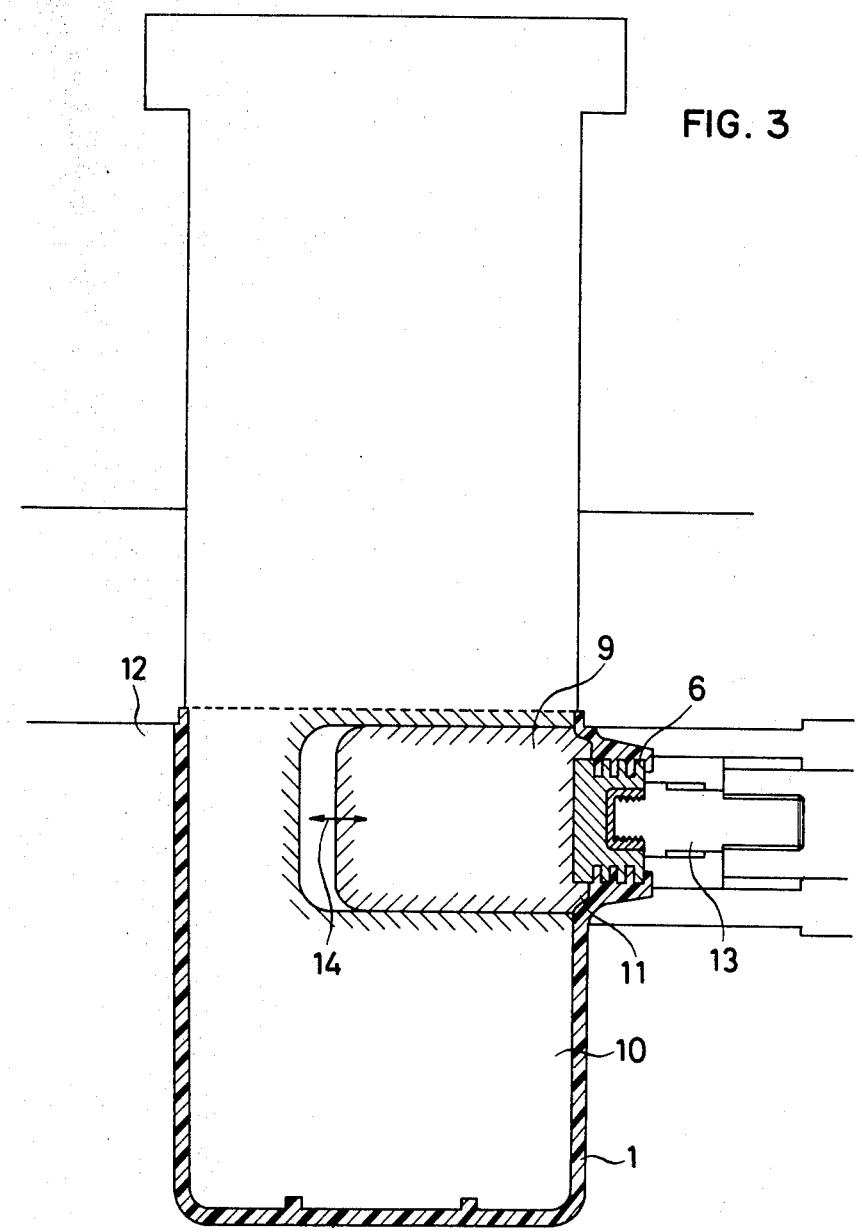

STORAGE BATTERY

BACKGROUND OF THE INVENTION

1. Field of the Invention

The present invention relates to a storage battery and particularly to improvements therein to provide improved liquid tightness, wherein electrode leading-out members are disposed across the lateral wall of an electrolyte container body and an electrode bar leading to an electrode plate is connected to the surface of each electrode leading-out member facing the inside of the electrolyte container body.

2. Description of the Prior Art

The electrolyte container of a storage battery is composed basically of an electrolyte container body and a lid, and the lid is liquid-tightly fixed on the top of the electrolyte container body. Eelctrodes and an electrolytic solution are contained in the electrolyte container to constitute a battery, while the electrode leading-out members are usually upwardly led out through the lid, the portions through which the electrode leading-out members extend are liquid-tightly sealed.

In such a storage battery, it sometimes becomes necessary to lead out the electrode leading-out members laterally through the electrolyte container body depending upon the usage of the storage battery. Such storage battery with the electrode leading-out members laterally lead out not only facilitates the electrical connection in a particular use but also decreases the length of the conductor member required for leading out from the electrodes inside the electrolyte container, thus saving electrode material, improving the electrical characteristics and making the battery light in weight. On the other hand, since the portions of such electrode leading-out members extending through the lateral wall of the electrolyte container are in contact with the electrolytic solution, a more effective liquid tightness is required.

The lateral leading-out of the electrode leading-out members is conventionally carried out as follows.

A hole is formed in the lateral wall of the electrolyte container body and an electrode leading-out member made of lead is fitted in said hole and fixed therein by crimping. This method involves a number of processing steps and, moreover the dependability of the liquid tightness of the region where the electrode leading-out member extends through the lateral wall of the electrolytic container is low. In order to solve these problems, it is known to fill the clearance between the electrode leading-out member and the lateral wall of the electrolyte container but this further increases the number of processing steps, which is not desirable. In cases where the electrolyte container of a storage battery is made of a material of poor adhesive property, such as polypropylene, the effectiveness of an adhesive agent can hardly be expected.

Further, when an electrolyte container body with laterally led out electrode leading-out members is prepared, a different problem will arise in the subsequent step. More particularly, in a storage battery having electrode leading-out members lead out laterally through the electrolyte container body, the step of providing an connection between the electrode leading-out member and the electrode bar leading to the electrode plate becomes a problem if the electrolyte container body is made of thermoplastic synthetic resin. More particularly, the electrode leading-out member is embedded in the lateral wall of the electrolyte container body and the electrical connection between the electrode leading-out member and the electrode bar is made by welding, but the heat generated during welding cannot be overlooked. Thus, this heat influences the thermoplastic synthetic resin around the electrode leading-out member, deforming or even melting the same. This results in lessening the liquid-tight effect of the region where the electrode leading-out member extends through the lateral wall of the electrolyte container body.

SUMMARY OF THE INVENTION

According to the invention, the problems described above can be advantageously solved.

In brief, the invention is realized by molding thermoplastic synthetic resin into an electrolyte container body which constitutes the main body of the electrolyte container of a storage battery, wherein said electrolyte container body is molded together with electrode leading-out members placed in advance in the molding die. As a result, the electrode leading-out members extend through and are held in the lateral wall of the electrolyte container body. Thus, the portion of the electrode leading-out member integrated with and extending through the lateral wall of the electrolyte container body results in a superior liquid tightness.

In a preferred embodiment of the invention, a spacing is defined between the peripheral edge of the surface of the electrode leading-out member facing the inside of the electrolyte container, namely, its surface to be welded to the electrode bar connected to a group of electrode plates, and the portion of the electrolyte container body existing around said surface. This spacing has the function of heat insulation so that the heat applied to said surface to be welded during welding may be transferred as little as possible to the portion of the electrolyte container body existing around said surface. This heat-insulating spacing is provided by a recess formed around said surface to be welded or by a difference in height between said surface to be welded and the inner wall surface of the electrolyte container body.

Further, according to the invention, it is possible to produce an electrolyte container body of thermoplastic synthetic resin having electrode leading-out members disposed therein to extend through the lateral wall thereof, with a spacing defined by a difference in plane between the surface of each electrode leading out member disposed inside the electrolyte container body and the portion of the electrolyte container body existing around said surface.

In the present method a female die and a male die are used for molding an electrolyte container body. A slide core is also used which is capable of sliding in a direction to cross the lateral wall surface of said male die, said slide core having a shape correlated with said spacing defined by a difference in plane, said slide core being adapted to form said spacing without obstructing the withdrawal of dies by virtue of its slidability.

Accordingly, a principal object of the invention is to provide a construction of a storage battery having electrode leading-out members led out laterally through the lateral wall of the electrolyte container body, said battery being characterized in that the liquid tightness of the region where the electrode leading-out members extend is superior.

In another aspect the invention provides a construction of a storage battery which is capable of solving the problem of the liquid tightness being degraded by the heat generated during welding of the electrode leading-out members which are laterally lead out.

In a further aspect the invention provides a method of producing an electrolyte container body wherein even if the electrolyte container has a spacing resulting from a difference in plane between the surface of each electrode leading-out member to be welded and the portion of the electrolyte container body existing around said surface, molding can be carried out without causing any trouble to the withdrawal of the dies.

These and other objects and features of the invention will become more apparent from the following detailed description given, by way of example, with reference to the accompanying drawings.

BRIEF DESCRIPTION OF THE DRAWINGS

FIG. 1 is a longitudinal section of an electrolyte container body, illustrating a preferred embodiment of the invention;

FIG. 2 is a longitudinal section showing a group of electrode plates inserted in the electrolyte container body of FIG. 1;

FIG. 3 is a schematic longitudinal section, illustrating a method of molding the electrolyte container body of FIG. 1;

FIGS. 4 through 7 illustrate a form of the slide core of FIG. 3, wherein FIG. 4 is a front view, FIG. 5 is a left-hand side view, FIG. 6 is a bottom view and FIG. 7 is a right-hand side view;

FIGS. 8 through 10 illustrate a form of a second slide core adapted to be moved relative to the slide core of FIG. 3, wherein FIG. 8 is a plan view, FIG. 9 is a front view and FIG. 10 is a right-hand side view;

FIGS. 11 and 12 illustrate the first and second slide cores in combination, wherein FIG. 11 is an end view in section taken along the line XI—XI of FIG. 12 and FIG. 12 is a diagrammatic front view;

FIGS. 13 and 14 illustrate the first and second cores in a different position from FIGS. 11 and 12 as a result of a relative motion taking place therebetween, wherein FIG. 13 is an end view in section taken along the line XIII—XIII of FIG. 14 and FIG. 14 is a diagrammatic side view; and FIGS. 15 and 16 are longitudinal sections showing a portion of an electrolyte container body, illustrating another preferred embodiment of the invention.

DESCRIPTION OF THE PREFERRED EMBODIMENTS

Figure 4:
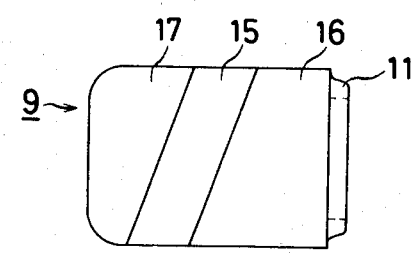
Figure 5:
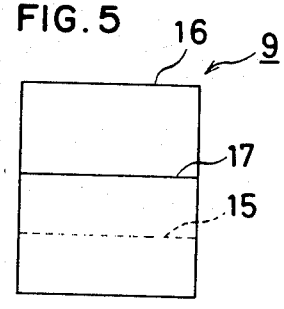
Figure 6:
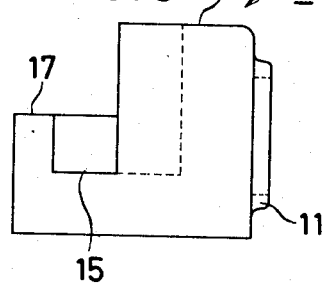
Figure 7:
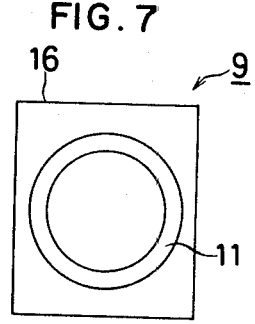

FIGS. 1 and 2 show an electrolyte container body 1. This electrolyte container body 1 will have a lid 2 fixed to the top thereof to close the upper opening therein in the final step of the production process. A group of electrode plates 3 is housed in the electrolyte container body 1. The electrode plates group 3 is placed on saddles 4 upwardly projecting from the bottom surface of the electrolyte container body 1. An electrode plate 5 is connected to the electrode plates group 3. The electrode plate 5 serves as one terminal, which is led out by an electrode leading-out member 6.

The electrode bar 5 is welded for electrical connection to the surface 7 of the electrode leading-out member 6 facing the inside of the electrode leading-out member 6 disposed across the lateral wall of the electrolyte container body 1. The electrolyte container body 1 shown herein is made of thermoplastic synthetic resin, while the electrode leading-out member is made, for example, of lead. The electrode leading-out member 6 is placed in a die for molding the electrolyte container body 1, so that the latter is molded integrally with the electrode leading-out member 6. In this connection, it is to be noted that an annular recess 8 is formed around the electrode leading-out member 6, said recess 8 forming a spacing between the peripheral edge of the surface 7 of the electrode leading-out member 6 and the portion of the electrolyte container body 1 of thermoplastic synthetic resin existing around said surface 7. The spacing defined by said recess 8 serves to heat-insulate the surface 7 of the electrode leading-out member 6 and the thermoplastic synthetic resin therearound constituting the electrolyte container body 1. Therefore, the heat generated by the welding between the electrode bar 5 and the surface 7 of the electrode leading-out member 6 is advantageously cut off by the recess 8, so that the thermoplastic synthetic resin of the electrolyte container body 1 is advantageously prevented from deforming or melting under the action of said heat.

FIG. 3 is a sectional view illustrating the outline of an advantageous method of producing the electrolyte container body 1 shown in FIG. 1. The electrolyte container body 1 having said recess 8 cannot be produced by the usual die molding process. For this reason, a special die shown in FIG. 3 is used. Thus, a male die having a slide core 9 slidable in the directions of double-headed arrow 14 is prepared. When it is desired to insert or remove the male die 10, the slide core 9 is retracted, and for injecting thermoplastic synthetic resin constituting the electrolyte container body 1 it is projected. The slide core 9 has a shaped portion 11 correlated with the recess 8, said portion 11 forming the recess 8 in the inner wall surface of the electrolyte container body 1. In addition, the electrode leading-out member 6 is held and positioned in a female die 12 by a holder 13. In this way, the electrolyte container body 1 provided with the recesses 8 and with the electrode leading-out members 6 disposed across the lateral wall is integrally made of thermoplastic synthetic resin.

FIGS. 4 through 14 illustrate a technique used for sliding the slide core 9 of FIG. 3 in the direction of arrow 14.

Referring to FIGS. 4 through 7, the slide core 9 has a groove 15 which extends obliquely. One side of the groove 15 is formed with a relatively high surface 16, while the other side is formed with a relatively low surface 17. Therefore, the wall surface defining the groove 15 has a substantially J-shaped section. A raised portion 11 which is a shaped portion correlated with the annular recess 8 is formed on the side of the lateral surface where a relatively high surface 16 is formed.

Figure 8:
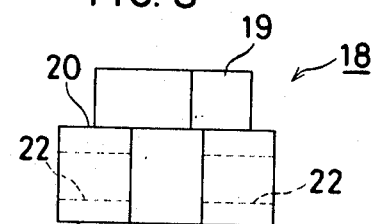
Figure 9:
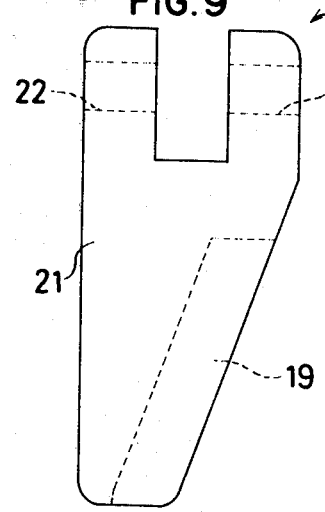
Figure 10:
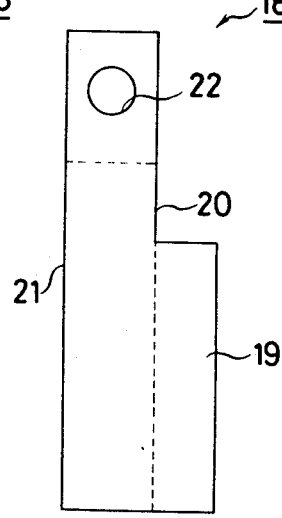

FIGS. 8 through 10 illustrate the construction of the second slide core 18 adapted to be moved relative to the first slide core 9. The second slide core 18 is combined with the first slide core 9 to execute relative motion. The manner of combination will be described with reference to FIGS. 11 through 14, but in brief they are combined in such a manner that the second slide core 18 oriented as shown in FIG. 9 is placed on the first slide core 9 oriented as shown in FIG. 4.

Figure 11:
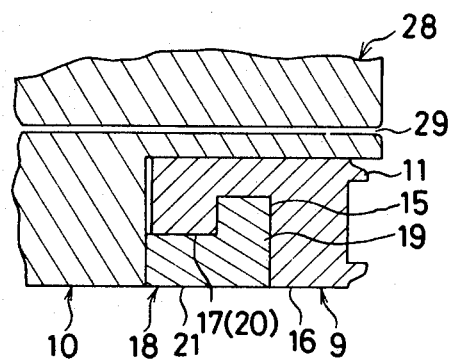
Figure 13:
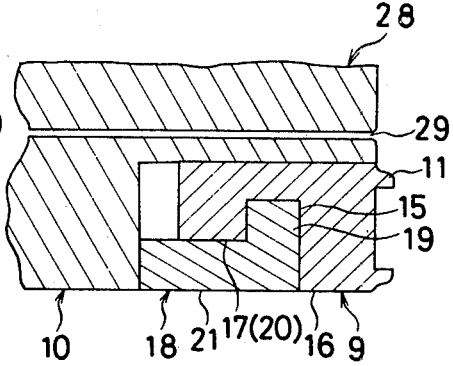

In order to achieve said combination, the second slide core 18 is provided with a ridge 19 adapted to fit in the groove 15 of the first slide core 9. When the ridge is 19 fitted in the groove 15, the surface 20 of the second slide core 18 contacts the surface 17 of the first slide core 9, with the opposite outer lateral surfaces of the ridge 19 contacting the opposite inner lateral surfaces of the groove 15 (FIGS. 11 and 13). The wide surface 21 of the second slide core 18 opposite to the surface 20 is flush with the surface 16 of the first slide core 9. In addition, the second slide core 18 is formed with throughgoing holes 22 for receiving a shaft (not shown) which moves substantially in parallel to serve as a drive part for sliding the second slide core 18.

Figure 12:
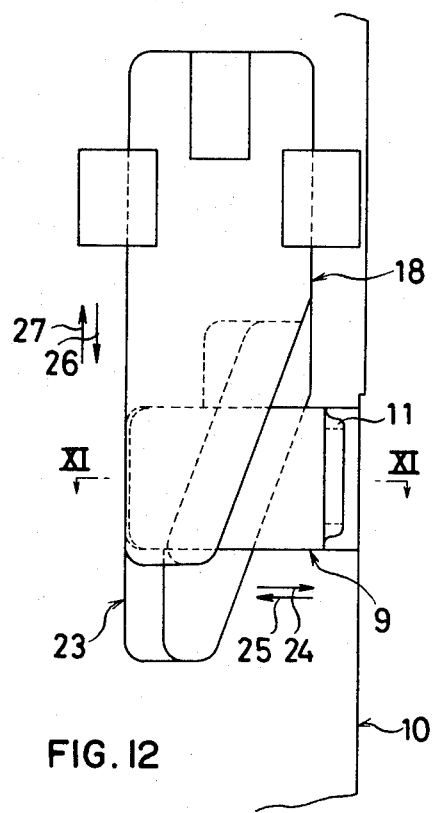

Referring to FIGS. 11 and 12, the male die 10 is provided with a space 23 for receiving the first and second slide cores 9 and 18 to allow them to slide in desired directions. Guided by the space 23, the first slide core slides in the direction of arrow 25, while the second slide core 18 slides in the direction of arrow 26 or 27. The state shown in FIGS. 11 and 12 is the end of the slide movement of the first and second slide cores 9 and 18 in the directions of arrows 25 and 27, respectively. The combination of the groove 15 and ridge 19 previously described establishes the operative association between the slide movement of the first slide core 9 in the direction of arrow 25 and the slide movement of the second slide core 18 in the direction of arrow 27 and the operative association between the slide movement in the direction of arrow 24 and the slide movement in the direction of arrow 26. In FIGS. 11 and 12, the first slide core 9 has been retracted and in this state the insertion into the female die 12 (FIG. 3) and the withdrawal from the female die 12 are effected.

Figure 14:
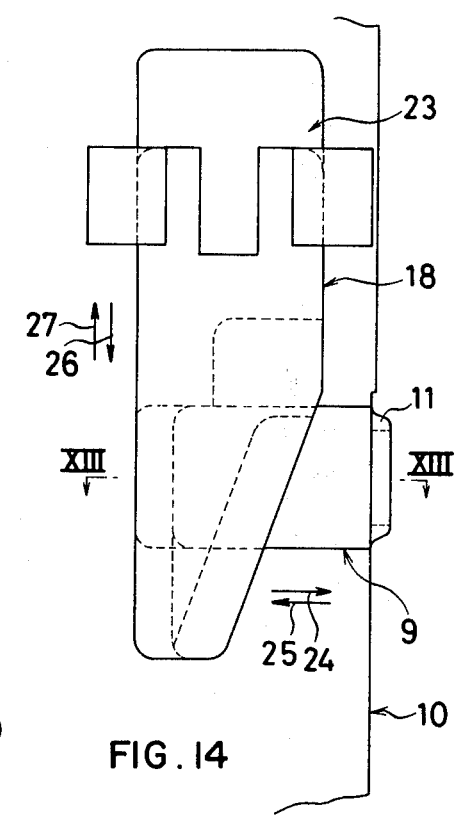

Referring to FIGS. 13 and 14, the state shown herein is the end of the slide movement of the second slide core 18 in the direction of arrow 26 and the slide movement of the first slide core 9 responding thereto in the direction of arrow 24. In this state, the annular projection 11 on the first slide core 9 is projecting through the lateral surface of the male die 10. If, therefore, the injection of thermoplastic synthetic resin is effected in this state, as described above, an annular recess 8 as shown in FIG. 1 will be formed on the inner wall surface of the electrolyte container body 1.

In addition, as shown in FIGS. 11 and 13, at least one more male die 28 is installed adjacent the male die 10. This is intended to indicate a die structure for providing a plurality of cells in a single electrolyte container body, the shape of the clearance 29 between the male dies 10 and 28 being selected in correlation with a partition wall formed in such electrolyte container body.

Referring to FIG. 15, another embodiment of the invention is shown wherein the surface 7 of the electrode leading-out member 6 is peripherally cut out to form a recess 30. Therefore, the recess 30 provides a spacing for heat insulation between the surface 7 and the thermoplastic synthetic resin forming the electrolyte container body 1. The other arrangements and the merits obtained by this embodiment are the same as the embodiment described above with reference to FIG. 1, etc., and the same method of production can also be applied with suitable modifications made to the slide core 9.

FIG. 16 is a longitudinal section of a portion of an electrolyte container body illustrating a further preferred embodiment of the invention. While the two embodiments described above are arranged so that the surface of the electrode leading-out member 6 is flush with the inner wall surface of the electrolyte container body 1 and the recess 8 is formed in the electrolyte container body 1 or the recess 30 in the electrode leading-out member 6, the embodiment shown in FIG. 16 is arranged so that the surface 7 of the electrode leading-out member 6 projects beyond the inner wall surface of the electrolyte container body 1. According to this embodiment, a raised wall portion 31 extending along the inner wall surface of the electrolyte container body 1 is formed, said wall portion 31 defining a spacing between the surface 7 and the thermoplastic synthetic resin portion of the electrolyte container body 1. With such embodiment also, it is possible to achieve heat insulation between the surface 7 and the thermoplastic synthetic resin portion of the electrolyte container body 1. The other arrangements are substantially the same as in the embodiments described above and a molding process using a slide core such a shown in FIG. 3 etc., can be employed.

As has been described so far, according to the preferred embodiments of the invention, since the surface 7 of the electrode leading-out member 6 to be welded and the thermoplastic synthetic resin portion of the electrolyte container body 1 are heat-insulated by a spacing, the heat generated by the welding of the surface 7 of the electrode leading-out member 6 and the electrode bar 5 will not influence the thermoplastic synthetic resin portion of the electrolyte container body 1, so that the deformation or melting of the thermoplastic synthetic resin which would impair the liquid-tight effect can be advantageously prevented.

In addition, the outer portion of the electrode leading-out member 6 serves as an outer terminal of the storage battery. An internally threaded member 32 made of electrically conductive material is installed therein for connection to another electrical element. In this connection, it is to be pointed out that there is no need to give consideration to the influence of the heat in such connecting operation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage battery comprising: an electrolyte container body having an opening in the upper surface produced by the molding of a thermoplastic synthetic resin, a lid fixed to the top of said electrolyte container body to close said upper surface opening and cooperating with said electrolyte container body to constitute an electrolyte container, a group of electrode plates housed in said electrolyte container, electrode bars operatively connected to said electrode plates, electrode leading-out members extending through the lateral wall of said electrolyte container body with their welding surfaces to be welded to said electrode bars facing the inside of said electrolyte container, said electrode leading-out members being presented at the lateral wall portion of said electrolyte container body when said electrolyte container body is molded with said electrode leading-out members placed in a die for molding said electrolyte container body, wherein a spacing is defined between the peripheral edge of said welding surface of each of said electrode leading-out members and a portion of said electrolyte container body extending around said welding surface, wherein said welding surface and the inner wall surface of said electrolyte container body extending around said welding surface are flush with each other, and wherein said spacing extending around the leading-out member is formed by the mold for said electrolyte container body, said spacing being formed by an annular recess in said inner wall surface of said electrolyte container body, said spacing being so located that the wall surfaces forming said spacing are defined by a portion of the respective electrode leading-out member and by a portion of the electrolyte container body.

2. A storage battery as set forth in claim 1, wherein said thermoplastic synthetic resin is polypropylene.

* * * * *

UNITED STATES PATENT AND TRADEMARK OFFICE
CERTIFICATE OF CORRECTION

PATENT NO. : 4,272,592
DATED : June 9, 1981
INVENTOR(S) : Shiro Miyagawa

It is certified that error appears in the above—identified patent and that said Letters Patent is hereby corrected as shown below:

On the Title Page, in the Abstract, lines 2 and 3,

"reading-out" should read -- leading-out --.

Signed and Sealed this

Twenty-seventh Day of April 1982

[SEAL]

Attest:

GERALD J. MOSSINGHOFF

Attesting Officer

Commissioner of Patents and Trademarks